United States Patent
Paulsen

(10) Patent No.: US 8,888,671 B2
(45) Date of Patent: Nov. 18, 2014

(54) METHOD FOR DISPOSAL OF DRILLING WASTE, CONTAMINATED SEDIMENTS AND RESIDUAL WASTE AND A DISPOSAL FACILITY FOR SAME

(75) Inventor: John Eirik Paulsen, Stavanger (NO)

(73) Assignee: Ott Subsea Bag Technology AS, Tananger (NO)

( * ) Notice: Subject to any disclaimer, the term of this patent is extended or adjusted under 35 U.S.C. 154(b) by 0 days.

(21) Appl. No.: 13/378,910

(22) PCT Filed: Jun. 17, 2010

(86) PCT No.: PCT/NO2010/000234
§ 371 (c)(1),
(2), (4) Date: Jan. 26, 2012

(87) PCT Pub. No.: WO2010/147482
PCT Pub. Date: Dec. 23, 2010

(65) Prior Publication Data
US 2012/0123180 A1  May 17, 2012

(30) Foreign Application Priority Data
Jun. 18, 2009 (NO) .................................. 20092352

(51) Int. Cl.
*B09B 1/00* (2006.01)
*E21B 21/06* (2006.01)

(52) U.S. Cl.
CPC ............... *E21B 21/066* (2013.01); *B09B 1/002* (2013.01)

USPC .......................................................... 588/250

(58) Field of Classification Search
CPC ............................. B09B 1/002; E21B 41/005
USPC .......................................................... 588/250
See application file for complete search history.

(56) References Cited

U.S. PATENT DOCUMENTS

| | | | |
|---|---|---|---|
| 3,396,542 A * | 8/1968 | Lamberton | 405/18 |
| 4,592,675 A * | 6/1986 | Scales et al. | 405/19 |
| 5,277,519 A | 1/1994 | Nahm | |
| 6,752,273 B2 * | 6/2004 | Reddoch | 209/2 |
| 7,086,472 B1 | 8/2006 | Incoronato | |

FOREIGN PATENT DOCUMENTS

| | | | |
|---|---|---|---|
| JP | 2004-211533 | * | 7/2004 |
| WO | WO99/46474 | | 9/1999 |
| WO | WO01/18352 A1 | | 3/2001 |
| WO | WO2007/102743 A1 | | 9/2007 |
| WO | WO2008/127123 A1 | | 10/2008 |
| WO | WO2009/078731 A1 | | 6/2009 |

* cited by examiner

*Primary Examiner* — John Kreck
(74) *Attorney, Agent, or Firm* — Gable Gotwals

(57) ABSTRACT

This invention relates to a method of treatment and disposal of drilling waste, contaminated sediments and residual waste including the steps of providing drilling waste, contaminated sediments, residual waste or other disposable material, grinding or crushing the material, mixing the material with at least one binder, using material exhibiting a maximum particle size of less than 5 mm; transferring the mixture to a disposal device placed in a benthic zone and allowing the mixture to cure in the disposal device. A disposal facility formed by the method of this invention is described.

12 Claims, 4 Drawing Sheets

METHOD FOR DISPOSAL OF DRILLING WASTE, CONTAMINATED SEDIMENTS AND RESIDUAL WASTE AND A DISPOSAL FACILITY FOR SAME

CROSS-REFERENCE TO RELATED APPLICATIONS

This application is the United States National Phase of PCT Patent Application No. NO2010/000234 filed on 17 Jun. 2010, which claims priority to Norwegian Patent Application No. 20092325 filed 18 Jun. 2009, both of which are incorporated herein by reference. United States Publication No. US2010/0303558 published on 2 Dec. 20101 and United States Publication No. US2011/0120721A1 published on 26 May 2011 are related by subject matter.

The present invention relates to a method for the safe disposal of drilling waste, contaminated sediments and residual waste. More particularly, the invention relates to a method for adding a binder to the mass sought stabilized and bringing this mixture to a disposal device, which is located in a benthic zone, and then allowing the stabilized mass to cure completely in the disposal device. The invention also relates to a disposal facility for the stabilized mass.

During drilling of wells for recovery of petroleum deposits below the sea floor, large amounts of drilled material, so-called cuttings, are carried out of the borehole. A person skilled in the art will know that the cuttings are carried out of the borehole by means of the drilling fluid being circulated from a vessel or rig on surface, via a drill string and out through a drill bit and into an annulus, which is defined between the borehole and the drill string, and back to the drilling rig where the fluid and cuttings are separated.

In connection with recovery of drilling fluids, the cuttings together with the drilling fluid are carried up to a cleaning plant placed on the vessel or rig. Typically, such a cleaning plant includes one or more screening devices known as vibratory separators, or so-called "shale shakers". By means of said cleaning plant, substantial portions of the cuttings are separated from the drilling fluid. The drilling fluid, which has been separated from the cuttings, is normally returned to a drilling-fluid circulation system and hence is reused. Such a cleaning plant requires equipment including interim storage receptacles for cuttings separated from the drilling fluid. Such interim storage receptacles, typically containers or so-called big bags, must be mobilized before the drilling starts, and they must be demobilized after completion of the drilling. In addition, the equipment must be organized on the vessel where space normally is very restricted. Moreover, and as a rule, the interim storage receptacles must be hoisted from the rig onto ships and transported to shore for emptying. Then the interim storage receptacles must be returned to the vessel. Such mobilizing and organizing of equipment require a considerable number of lifts by crane, which involves a safety risk to personnel and the equipment may also be damaged. There is also a risk of contamination due to spillage and emissions into the outside environment, for example.

Drilling waste from petroleum activity implies cuttings with adhered drilling fluid which has not been removed in a cleaning plant. The drilling waste may appear as a liquid or viscous substance and may contain particles of different sizes. The drilling fluid may be water-based, oil-based, or contain synthetic compounds imitating the properties of an oil-based drilling fluid. Usually the drilling fluid is an emulsion. In addition, the drilling waste may contain water, chemicals and minerals, for example barite ($BaSO_4$) and limenite ($FeTiO_3$). Further, the drilling waste may contain oil and petroleum residues. Yet further, the drilling waste may contain heavy metals, which may originate from chemicals being used on the actual drilling equipment, or from the rock formation being drilled.

Contaminated sediments imply contaminated sediments from a sea bottom, river bottom, and lake bottom, for example a harbour basin, but also contaminated soil due to emissions from industrial activity.

Residual waste implies masses from pits and mining operations after having separated the desirable materials from the extracted mass, and other masses from processing industries.

A benthic zone implies an ocean bottom, sea bottom, lake bottom, or river bottom. The benthic zone extending from a water edge, shore edge, or river bank and out into the sea or water.

The cleaning of drilling waste may take place by virtue of heat treatment at a temperature of 250-800° C. and higher. This is energy-intensive and expensive. The residual material will contain heavy metals and must be treated further before it can be disposed of.

During excavation or drilling into the ground on a sea bottom or on land, mass is broken loose and must be removed from the excavation or drilling area. When handled, the liberated mass may represent a disadvantage insofar as it may be spread to the surrounding environment. For instance, when dredging a sea bottom, for example, sometimes there is no need for removing the mass from the bottom. Other times, there may be requirements for the mass to be removed from the bottom, particularly if the mass is contaminated, for example mass from a harbour basin. It is implicit, however, that the mass must be moved from a first area to a second area on the sea bottom. It is known for this moving of mass to be carried out by pumping the mass away from the area where the mass is removed from. A substantial disadvantage of this type of dredging operation is that large areas located downstream of the dredging operation become covered with the mass. This mass is capable of harming the benthic fauna. Therefore, in some locations, there are requirements for dredged mass, or mass removed in some other way, to be pumped ashore for possible cleaning and disposal at approved disposal facilities. This is a very expensive operation.

When disposing of residual waste from the mining or processing industry, it is known to place it in open disposal facilities onshore or in the sea. In those cases where such residual waste includes particles of fines, it has proven problematic to prevent spreading of the residual waste to surrounding areas. The problem is particularly big while the mass is being moved.

From patent document WO 2001/018352 it is known to use a number of storage receptacles for drilling waste. They are anchored to the sea bottom in vicinity of a drilling vessel. The drilling waste is pumped from the drilling vessel and onwards to the storage receptacles. When the storage receptacles are full, they are carried to a land-based treatment facility by means of a tugboat. Empty receptacles are returned and anchored.

From patent document WO 2007/102743 it is known to stabilize drilling waste by adding cement and/or a pozzolanic additive. Other additives, such as accelerators, fibres and vegetable oil, may also be added to make the end product stronger and/or to prevent leakage of encapsulated material. The end products may be cast in moulds.

From patent document WO 2008/127123 it is known to continuously add a binder to drilling waste. This can be done aboard a drilling vessel or a drilling rig. The drilling waste goes through a crushing/grinding process and a mixing process in which a binder, for example cement, and other chemicals are added in order for the mass to undergo a hydration and curing process. Stabilization, curing and hydration of the cuttings may take 2-3 days and the final product is a dry, granulated material. Then, the granulated material may be carried to a disposal facility, or be used for further processing on land. Of special interest is the possibility of dumping the granulated material into the sea.

U.S. Pat. No. 5,277,519 discloses the adding of blast-furnace slag to the drilling fluid. After separation of drilling fluid from the drilling waste, the concentrated drilling waste will cure and form a solid mass when left to rest.

It is also known that the drilling waste may be slurrified and reinjected into the formation. It is further known that slurrified cuttings with additives may be used as a drill-start mud, so-called "spud mud", in exploration drilling. Spud mud is used when the topmost sections of the well are drilled, typically the 36" and 26" sections. The disadvantage of this method is that the spud mud has a limited durability over time, it has to be stored until it is to be used, and oftentimes it has to be transported over long distances.

Patent document PCT/NO2008/000447, which belongs to the applicant, discloses a collecting device for solid materials moved, by means of a fluid, from a first location, for example a sea bottom, on an offshore installation or on land, to a second location. The collecting device may be made of a cloth-like material, which renders possible for the collecting device to be placed on, for example, a sea bottom in a packed-up state, for example rolled up or folded up. The collecting device is of such a construction that when being filled, the collecting device will unfold from a packed-up position into a fully unfolded position.

The object of the invention is to remedy or reduce at least one of the disadvantages of the prior art.

The object is achieved by virtue of features disclosed in the following description and in the subsequent claims.

In a first aspect, the invention relates to a method for treatment and disposal of drilling waste, contaminated sediments and residual waste, the method comprising:
  step 1, providing drilling waste, contaminated sediments, residual waste, or other disposable material;
  step 2, grinding or crushing the material from step 1;
  step 3, mixing the material from step 2 with at least one binder;
and the method further comprising;
using material from step 2 exhibiting a maximum particle size of less than 5 mm;
  step 4, transferring the mixture from step 3 to a disposal device placed in a benthic zone or on a sea bottom; and
  step 5, allowing the mixture from step 4 to cure in the disposal device.

Step 1 may include a pre-treatment of drilling waste, contaminated sediments, residual waste, or other disposable material on a rig/vessel or at the place where reception of the mass takes place. The pre-treatment may comprise one or more of the operations of: separating solids from liquid, drying, separating solids based on the size of individual components of the mass and separating solids based on the weight of individual components of the mass. The pre-treatment may be carried out using techniques known per se, for example using hydrocyclones, centrifuges or other techniques having the characteristic of individual components being separated on the basis of the shape, weight, size, or other essential properties of the individual components. After the pre-treatment, the separated solids may be stored in different fractions as a sorted mass.

The pre-treatment renders possible to isolate, from the mass, individual components which are not compatible with the binder and any other additives, or which could impair the quality of the encapsulated and stabilized material. Quality in this context is related to how well and possibly how long the binder and possible additives immobilize and stabilize contaminations after the material is fully cured.

The pre-treatment renders possible to compose the composition of the mixture in step 3 in the best possible way, for example by mixing sorted mass from the different fractions in accordance with a desired binder prescription. It may prove advantageous to check the amount of particles having a diameter of less than 20 micrometers, and further advantageous to check the amount of particles having a diameter of less than 1 micrometer. It is important, in general, to be able to isolate fractions of the mass on the basis of particle size.

Equipment for carrying out the mixing in step 3 is known per se, such as disclosed in WO 2000/127123, for example. Transferring the mixture to a disposal device in accordance with step 4 may be carried out by means of technology known from the petroleum industry, among others, in which it is common to form cement-based mixtures which are injected into the annulus between the drill string and the casing.

In one embodiment, the material in step 2 is allowed to undergo a division by means of a dividing device taken from the group consisting of a pump, a roller, or a mill. The person skilled in the art will know what type of dividing device is suitable for the purpose. Advantageously, division of the material allows for easier pumping of the material through pipes and hoses, and allows for use of pipes and hoses of smaller dimensions. Advantageously, the material from step 2 may exhibit a maximum particle size of less than 2 mm. Further advantageously, the material from step 2 may exhibit a maximum particle size of less than 1 mm.

The binder in step 3 may consist at least of one binder selected from a group consisting of a cement-based binder, a pozzolanic binder, fly ash, or blast-furnace slag. For example, a pozzolanic binder may be a natural pozzolanic binder, such as aplite. These binders may also be combined. It may be of further advantage to add additives, for example accelerators, fibres and vegetable oil, to the mixture from step 3. The person skilled in the art will know what additives may be used and the particular level of addition thereof to stabilize the mixture so as to prevent leakage there from of heavy metals and organic compounds. The person skilled in the art will also know what additives may be used and the particular level of addition thereof so as to achieve an appropriate curing time for the mixture. It is of further advantage for the mixture from step 3 to be substantially immiscible with water. Thus, the mixture wilt displace water present in the disposal device in step 4 and fill it while, at the same time, there is minimal leakage of undesired substances to the surroundings.

The disposal device in step 4 may be selected from the group consisting of a bag with flexible walls, a receptacle with fixed walls, or a closed enclosure. The disposal device may serve as a formwork mould for the mixture from step 3. The wall material of said bag; receptacle, or enclosure may be permeable to liquid, or a portion of the wall may be permeable to liquid. The advantage thereof is that water displaced by the pumped-in mixture from step 3 may be evacuated through the walls of the disposal device while the mixture is retained at the same time. The wall material may consist of a biodegradable material. In an alternative embodiment, the wall material may consist of a material that disintegrates slowly. The advantage thereof is that the wall material forms a further barrier for retaining encapsulated and stabilized material. The closed enclosure may be formed by virtue of the disposal device defining, in a material-tight manner, a portion of a benthic zone, for example a sand bottom or a rock bottom. Thereby, the stabilized material from step 2 is disposed directly on the bottom in a limited portion of a benthic zone, and the disposal facility is formed by the walls of the disposal device.

In a second aspect, the invention relates to a disposal facility structured in a manner allowing it to accommodate drilling waste, contaminated sediments, or residual waste, wherein the disposal facility is formed from a disposal device placed within a benthic zone, and a solid, fully cured mass comprising stabilized drilling waste, stabilized contaminated sediments, or stabilized residual waste; and wherein the disposal device forms a formwork mould. The disposal facility may be a permanent disposal facility.

The disposal device may be selected from the group consisting of a bag with flexible walls, a receptacle with fixed walls, or a closed enclosure. The disposal device may include a material-tight material. The disposal device may include a cloth-like material. The disposal device may include a material permeable to liquid. The disposal device may include a portion permeable to liquid. In an alternative embodiment, the disposal device may include a biodegradable material. In a further alternative embodiment, the wall material may consist of a material that disintegrates slowly.

In an alternative embodiment, the disposal device may form a closed enclosure structured in a manner allowing it to enclose, in a material-tight manner, a portion of a benthic zone.

Stabilized drilling waste, stabilized contaminated sediment, or stabilized residual waste may include at least one binder selected from a group consisting of a cement-based binder, a pozzolanic binder, fly ash, or blast-furnace slag. The stabilized drilling waste, the stabilized contaminated sediment, or the stabilized residual waste may comprise particles having a maximum particle size of less than 5 mm. In an alternative embodiment, the stabilized drilling waste, the stabilized contaminated sediment, or the stabilized residual waste may comprise particles having a maximum particle size of less than 2 mm. In a further alternative embodiment, the stabilized drilling waste, the stabilized contaminated sediment, or the stabilized residual waste may comprise particles having a maximum particle size of less than 1 mm.

Hereinafter, an example of a preferred embodiment is described and is depicted in the accompanying drawings, in which.

Figure 3:
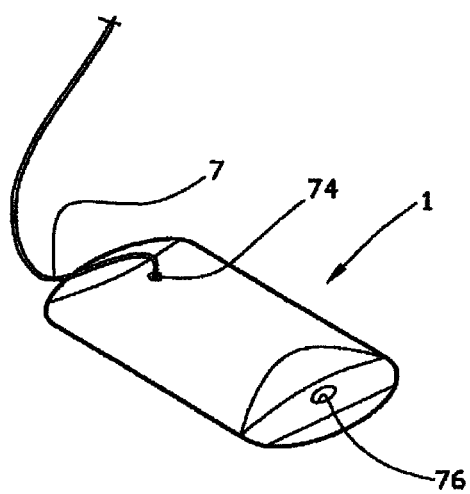
Figure 4:
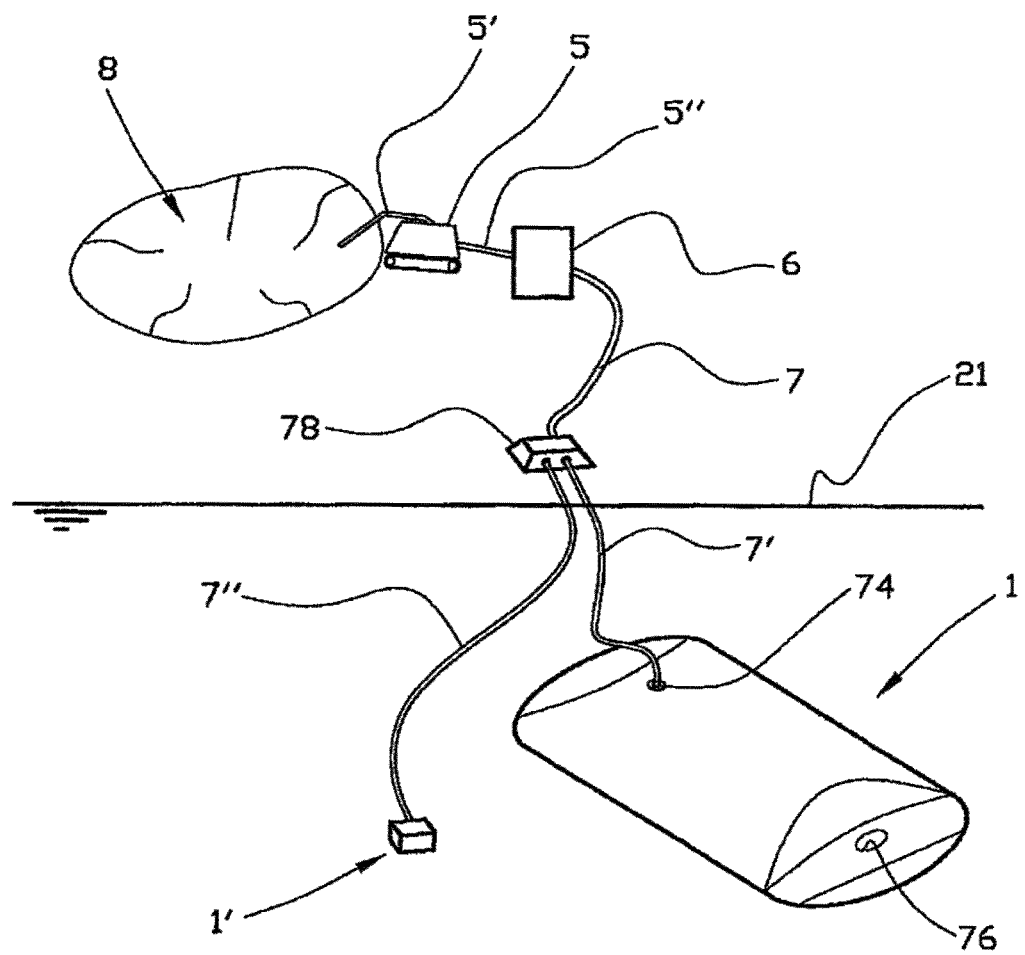

FIG. 3 shows a further alternative embodiment of the disposal device, wherein the disposal device is in the form of a bag provided with a permeable portion at the surface of the bag; and FIG. 4 shows a principle drawing of a method according to a second embodiment of the present invention, wherein a disposal device in the form of a bag is placed within a benthic zone in connection with a dredger on land.

It will be appreciated that the figures are not to scale, and that the relative size proportions between the individual components are not depicted with the correct, relative proportions.

Figure 1:
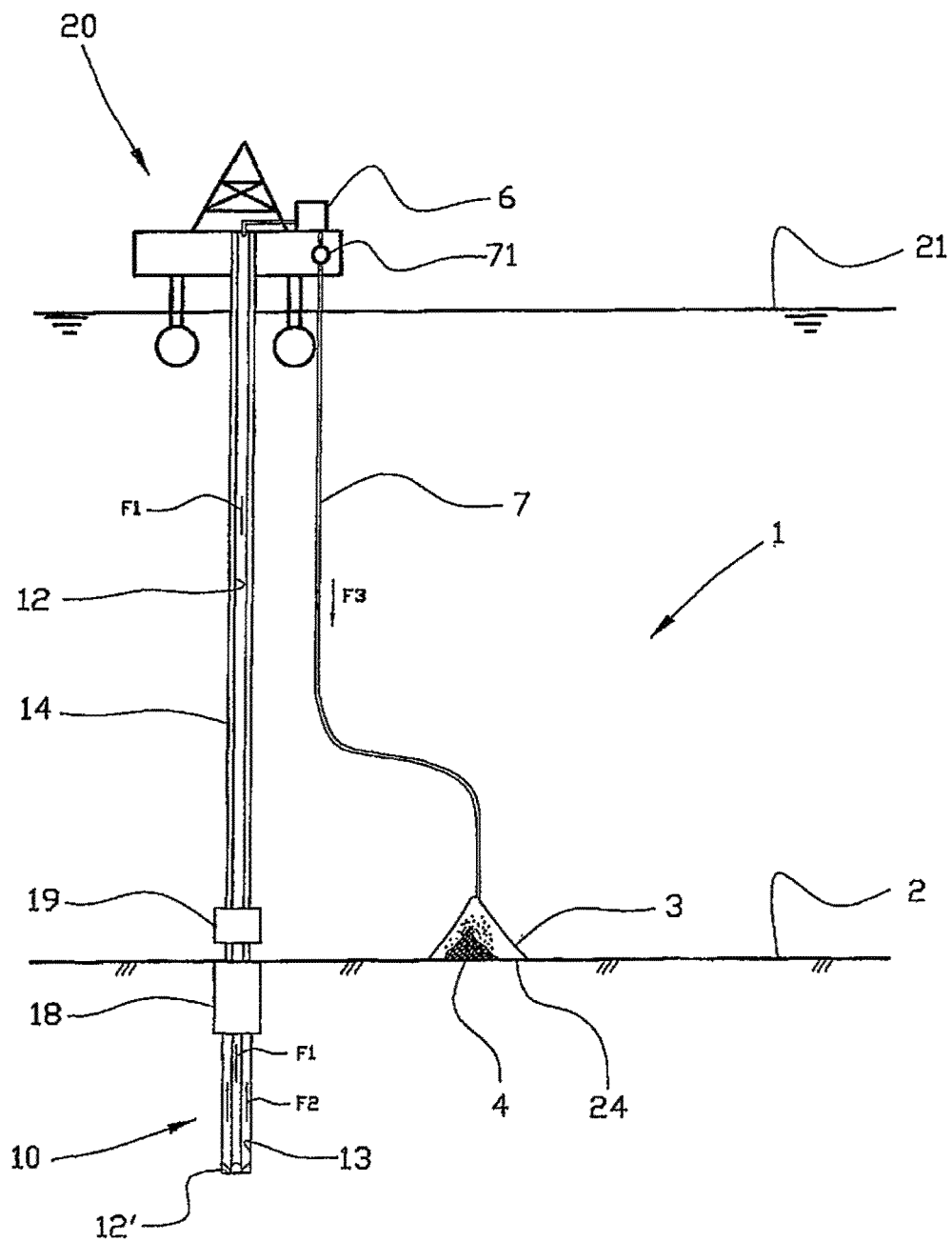
FIG. 1 shows a principle drawing of a method according to a first embodiment of the present invention, wherein a disposal device in the form of an enclosure is placed within a benthic zone in connection with a drilling rig.
Figure 2:
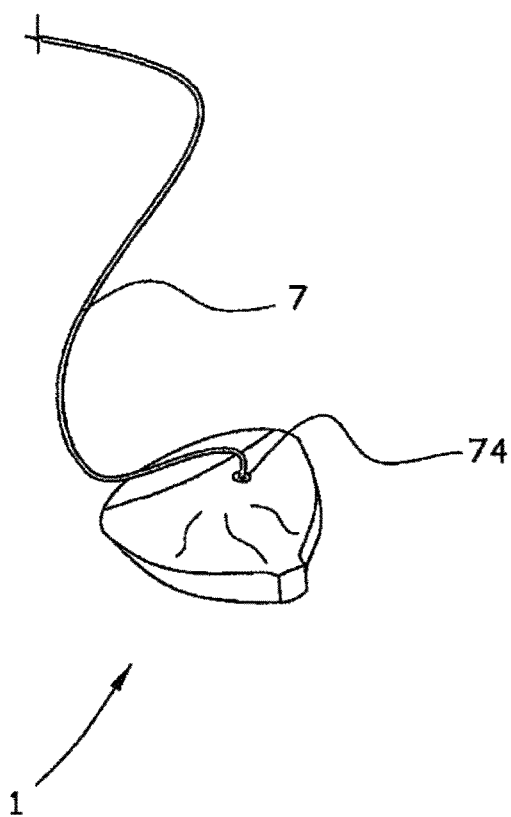
FIG. 2 shows, in larger scale, an alternative embodiment of the disposal device, wherein the disposal device is in the form of a bag.

In FIGS. 1-3, reference numeral 1 indicates a disposal device in accordance with the present invention, wherein the disposal device 1 is connected in a fluid-communicating manner to a drilling rig 20 floating on a water surface 21.

The disposal device 1 is placed in a benthic zone in the form of a sea bottom 2 nearby a well 10. The well 10 includes a wellhead 18 and a blowout preventer 19. Cuttings are circulated out of the well 10 in an annulus 13, which is defined by a drill string 12 and a riser 14, by means of drilling fluid being pumped from the drilling rig 20 and down through the drill string 12, via a drill bit 12', and out into the annulus 13.

In the figures, the flow directions of the drilling fluid, a mixture of drilling fluid and cuttings and stabilized drilling waste 4 are indicated with arrows marked F1, F2 and F3, respectively.

The disposal device 1, which is in the form of an enclosure 1, includes a wall 3, and the disposal device 1 encloses, in a material-tight manner, a portion 24 of the sea bottom 2.

The fluid-supply line 7 extends from the drilling rig 20 to the disposal device 1. Thus, the flow F3 of stabilized drilling waste 4 is carried into the disposal device 1 and will be fully cured therein. As stabilized drilling waste 4 gradually enters the disposal device 1, water will evacuate out through the water-permeable wall 3, or between the wall 3 and the sea bottom 2.

On board the drilling rig 20, cuttings spanning a predetermined particle size are removed from the drilling fluid which, together with the cuttings, flows up from the riser 14. This takes place by means of technology known per se, which is in the form of one or more screening devices (not shown). The separated drilling waste may go through a step of particle-size reduction before being mixed, with a binder and other additives of types known per se, into stabilized, pumpable drilling waste 4 within a mixing device 6 of a type known parse. After the mixing in the mixing device 6, the drilling waste 4 is pumped through the fluid-supply line 7 by means of a pumping device 71, which is of a type known per se, and into the disposal device 1 within which the drilling waste 4 is fully cured so as to form a solid mass. Alternatively, the drilling waste may go through a size reduction simultaneous with or after being mixed with the binder (not shown).

FIG. 2 and FIG. 3 show, in larger scale, alternative embodiments of the very disposal device 1. The manner in which the disposal device 1 is connected to the mixing device 6 by means of the fluid-supply line 7, and the manner in which drilling fluid and cuttings are carried up to the drilling rig 20, correspond to that described above and hence will not be discussed in further detail.

The disposal device 1 shown in FIG. 2 is made from a cloth-like material so as to form a material-tight bag 1. The fluid-supply line 7 runs into the bag 1 at an inlet portion 74. In one embodiment, the cloth-like material may be permeable to liquid in order to facilitate evacuation of liquid from the disposal device 1 when being filled with stabilized material 4.

The disposal device 1 shown in FIG. 3 is made from a cloth-like material so as to form a material-tight bag 1. The fluid-supply line 7 runs into the bag 1 at an inlet portion 74. At an end portion distal to, or at a distance from, the inlet portion 74, the disposal device 1 is provided with an outlet opening 75 shown in an embodiment where an upper portion of the wall of the disposal device 1 is provided with a water-permeable portion 76.

According to needs, material strength and possible statutory restrictions, such as height restrictions for so-called overtrawlability, a disposal device 1 according to the invention may be made in very many different sizes. For operations on the sea bottom, tests have shown that a disposal device 1 having a length of 30-50 m, and a width or diameter of 10-20 m, is suitable, and that a disposal device 1 having a length of ca. 20 m, and a width or diameter of ca. 4 m, is very suitable.

Filled disposal devices 1 containing fully cured drilling waste 4 may be used as blocks in the construction of piers or artificial reefs, for example, and for backfilling depressions and ditches on a sea bottom. The size and shape of the disposal device 1 may be adapted to such purposes. Artificial reefs may be built in vicinity of, for example, a drilling installation 20 by placing the disposal devices 1 appropriately relative to each other, for example beside each other and/or on top of each other.

FIG. 4 shows an alternative embodiment for collection and stabilization of mud 8 from a dredger 5 in a beach area. The dredger 5 is provided with a suction line 5' which sucks mud mass 8 and water, wherein the mud mass 8 and water is pumped via the fluid line 5" and into a mixing device 6 of a type known per se. After being mixed in the mixing device 6 with a binder and possibly other additives of types known per se, stabilized mud mass 4 is pumped via the fluid-supply line 7 into the disposal device 1, which is placed in a benthic zone 2 below a water surface 21. A person skilled in the art will appreciate that it is possible to connect one or more pumping devices (not shown) to the suction line 5', the fluid line 5", and the fluid-supply line 7. The person skilled in the art will also appreciate that, in an alternative embodiment, the dredger 5 may be located on a barge for dredging of a bottom, and that the method of the invention may be used along with any necessary, skilled adjustments.

The disposal device 1 shown is of the same type as that shown in FIG. 3. In FIG. 4, two disposal devices 1, 1' are placed beside each other. One disposal device 1 is partly filled with stabilized mud mass 4, whereas the other disposal device 1' is in a packed-up position. Both disposal devices 1, 1' are connected to a distribution frame 78, but only the line 7' from the disposal device 1 is in fluid-communication with the dredger 5. Thus, the line 7" extending between the packed-up disposal device 1' and the distribution frame 78 is not in fluid-communication with the fluid-supply line 7.

The person skilled in the art will know that a distribution frame 78 and an associated plurality of disposal devices 1, 1' advantageously may be used also in connection with a drilling rig for continuous operation in context of changing from a full disposal device 1 to an empty disposal device 1'.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A method for treatment and disposal of contaminated drilling waste and contaminated sediments, said method comprising the following steps:
    step 1, providing material selected from the group consisting of: contaminated drilling waste and contaminated sediments, and separating the contaminated material into different fractions and separating the contaminated material for compatibility with at least one binder;
    step 2, grinding or crushing some fractions of the separated contaminated material from step 1 to a particle size less than 5 mm;
    step 3, mixing all the material from step 2 with at least one binder that is compatible with the separated contaminated material to form a stabilized mixture that is substantially immiscible with water, and all of the material from step 2 is less than 5 mm;
    step 4, transferring the stabilized mixture from step 3 through a fluid supply line extending from a drill rig to a disposal device placed in a benthic zone; and
    step 5, allowing the stabilized mixture from step 4 to cure in the disposal device.

2. The method in accordance with claim 1, of allowing the material from step 2 to undergo a division by means of a dividing device taken from the group consisting of a pump, a roller, or a mill.

3. The method in accordance with claim 1 of using material from step 2 exhibiting a maximum particle size of less than 2 mm.

4. The method in accordance with claim 1 of using material from step 2 exhibiting a maximum particle size of less than 1 mm.

5. The method in accordance with claim 1, wherein the binder in step 3 consists of at least of one binder selected from a group consisting of: a cement-based binder, a pozzolanic binder, fly ash, or blast-furnace slag.

6. The method in accordance with claim 1, wherein the disposal device is selected from the group consisting of: a bag with flexible walls, a receptacle with fixed walls, or a closed enclosure.

7. A disposal facility, said facility comprising:
    a disposal device forming a closed enclosure structured to enclose, in a material-tight manner, a portion of a benthic zone and being structured to receive through a fluid supply line extending from a drilling rig and into an inlet portion located below the water a stabilized mixture that is substantially immiscible with water and which displaces any water that may be present in the disposal device, the stabilized mixture containing pre-selected and pre-sized contaminated drilling waste or contaminated sediments and a binder selected to be compatible with the contaminated pre-selected and pre-sized drilling waste or sediments;
    a solid, fully cured mass formed by the stabilized mixture that is substantially immiscible with water and thereby preventing minimal leakage of undesired contaminated substances to the surroundings and
    a formwork mould being formed by the disposal device and located below the water surface.

8. The disposal facility in accordance with claim 7, wherein the disposal device includes a material-tight material.

9. The disposal facility in accordance with claim 7, wherein the disposal device includes a cloth-like material.

10. The disposal facility in accordance with claim 7, wherein the disposal device includes a material permeable to liquid.

11. The disposal facility in accordance with claim 7, wherein the stabilized drilling waste or stabilized contaminated sediment includes at least one binder selected from a group consisting of: a cement-based binder, a pozzolanic binder, fly ash, or blast-furnace slag.

12. The disposal facility in accordance with claim 7, wherein the stabilized drilling waste or the stabilized contaminated sediments, comprises particles having a maximum particle size of less than 5 mm.

* * * * *